(12) United States Patent
Fripp et al.

(10) Patent No.: US 11,174,700 B2
(45) Date of Patent: Nov. 16, 2021

(54) SWELLABLE METAL FOR NON-ELASTOMERIC O-RINGS, SEAL STACKS, AND GASKETS

(71) Applicant: Halliburton Energy Services, Inc., Houston, TX (US)

(72) Inventors: Michael L. Fripp, Carrollton, TX (US); Stephen Michael Greci, Little Elm, TX (US); Zachary William Walton, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/643,804

(22) PCT Filed: Nov. 13, 2017

(86) PCT No.: PCT/US2017/061307
§ 371 (c)(1),
(2) Date: Mar. 2, 2020

(87) PCT Pub. No.: WO2019/094044
PCT Pub. Date: May 16, 2019

(65) Prior Publication Data
US 2020/0240235 A1 Jul. 30, 2020

(51) Int. Cl.
*E21B 33/12* (2006.01)
*F16J 15/08* (2006.01)
(Continued)

(52) U.S. Cl.
CPC .......... *E21B 33/1212* (2013.01); *E21B 34/06* (2013.01); *F16J 15/08* (2013.01);
(Continued)

(58) Field of Classification Search
CPC ....... E21B 33/1212; F16J 15/068; F16J 15/08
See application file for complete search history.

(56) References Cited

U.S. PATENT DOCUMENTS

| 3,046,601 | A | 7/1962 | Hubbert et al. |
| 4,846,278 | A | 7/1989 | Robbins |

(Continued)

FOREIGN PATENT DOCUMENTS

| CA | 3085547 A1 | 8/2019 |
| EP | 2217790 B1 | 10/2016 |

(Continued)

OTHER PUBLICATIONS

International Search Report and Written Opinion dated Aug. 2, 2018; International PCT Application No. PCT/US2017/061307.
(Continued)

*Primary Examiner* — Cathleen R Hutchins
(74) *Attorney, Agent, or Firm* — McGuireWoods LLP

(57) ABSTRACT

Swellable metal sealing elements and methods for forming a seal in a wellbore using said swellable metal sealing elements. An example method comprises providing a swellable metal sealing element selected from the group consisting of an O-ring, a gasket, or a seal stack; wherein the swellable metal sealing element is disposed in or around a downhole tool disposed in the wellbore. The method further comprises exposing the swellable metal sealing element to a brine and allowing or causing to allow the swellable metal sealing element to swell.

20 Claims, 8 Drawing Sheets

(51) Int. Cl.
  *E21B 34/06* (2006.01)
  *E21B 41/00* (2006.01)
  *E21B 43/12* (2006.01)
  *F16J 15/06* (2006.01)
(52) U.S. Cl.
  CPC .............. *E21B 41/00* (2013.01); *E21B 43/12* (2013.01); *E21B 2200/06* (2020.05); *F16J 15/068* (2013.01)

(56) References Cited

U.S. PATENT DOCUMENTS

| | | | |
|---|---|---|---|
| 6,098,717 | A | 8/2000 | Bailey et al. |
| 6,695,061 | B2 | 2/2004 | Fripp et al. |
| 7,040,404 | B2 | 5/2006 | Brothers et al. |
| 7,543,639 | B2 | 6/2009 | Emerson |
| 7,562,704 | B2 | 7/2009 | Wood et al. |
| 7,578,347 | B2 | 8/2009 | Bosma et al. |
| 7,909,110 | B2 | 3/2011 | Sharma et al. |
| 7,931,079 | B2 | 4/2011 | Nicholson |
| 8,083,000 | B2 | 12/2011 | Nutley et al. |
| 8,235,075 | B2 | 8/2012 | Saltel |
| 8,240,377 | B2 | 8/2012 | Kulakofsky et al. |
| 8,434,571 | B2 | 5/2013 | Kannan et al. |
| 8,443,881 | B2 | 5/2013 | Thomson et al. |
| 8,490,707 | B2 * | 7/2013 | Robisson ............ E21B 33/1208 166/387 |
| 8,499,843 | B2 | 8/2013 | Patel et al. |
| 8,776,899 | B2 | 7/2014 | Fripp et al. |
| 9,133,683 | B2 | 9/2015 | Dyer et al. |
| 9,518,453 | B2 | 12/2016 | Dilber et al. |
| 9,725,979 | B2 | 8/2017 | Mazyar et al. |
| 9,745,451 | B2 | 8/2017 | Zhao et al. |
| 9,856,710 | B2 | 1/2018 | Zhu et al. |
| 10,851,615 | B2 | 12/2020 | Watson et al. |
| 10,961,804 | B1 | 3/2021 | Fripp et al. |
| 2003/0150614 | A1 | 8/2003 | Brown et al. |
| 2004/0149418 | A1 | 8/2004 | Bosma et al. |
| 2005/0092485 | A1 | 5/2005 | Brezinski |
| 2005/0171248 | A1 | 8/2005 | Li et al. |
| 2005/0199401 | A1 * | 9/2005 | Patel .................. E21B 33/1208 166/387 |
| 2007/0089911 | A1 | 4/2007 | Moyes |
| 2007/0095532 | A1 | 5/2007 | Head et al. |
| 2007/0200299 | A1 | 8/2007 | Kunz |
| 2008/0066931 | A1 | 3/2008 | Xu |
| 2008/0142214 | A1 | 6/2008 | Keller |
| 2008/0149351 | A1 | 6/2008 | Marya et al. |
| 2008/0185158 | A1 | 8/2008 | Chalker et al. |
| 2009/0020286 | A1 | 1/2009 | Johnson |
| 2009/0179383 | A1 | 7/2009 | Koloy et al. |
| 2009/0188569 | A1 | 7/2009 | Saltel |
| 2009/0242189 | A1 | 10/2009 | Vaidya et al. |
| 2009/0272546 | A1 | 11/2009 | Nutley et al. |
| 2010/0038074 | A1 * | 2/2010 | Patel .................. E21B 33/1216 166/187 |
| 2010/0270031 | A1 | 10/2010 | Patel |
| 2011/0073310 | A1 | 3/2011 | Clemens |
| 2011/0226374 | A1 | 9/2011 | Kalman |
| 2011/0253393 | A1 | 10/2011 | Vaidya et al. |
| 2012/0073834 | A1 | 3/2012 | Lembcke |
| 2012/0132427 | A1 | 5/2012 | Renshaw et al. |
| 2012/0175134 | A1 | 7/2012 | Robisson et al. |
| 2012/0205092 | A1 | 8/2012 | Givens et al. |
| 2012/0272546 | A1 | 11/2012 | Tsai |
| 2012/0292013 | A1 | 11/2012 | Munshi et al. |
| 2013/0056196 | A1 | 3/2013 | Hench |
| 2013/0146312 | A1 | 6/2013 | Gerrard et al. |
| 2014/0054047 | A1 | 2/2014 | Zhou |
| 2014/0060815 | A1 * | 3/2014 | Wang .................. E21B 33/1208 166/179 |
| 2014/0238692 | A1 | 8/2014 | Watson |
| 2014/0251641 | A1 | 9/2014 | Marya et al. |
| 2014/0262351 | A1 | 9/2014 | Derby |
| 2014/0361497 | A1 | 12/2014 | Porta |
| 2015/0101813 | A1 | 4/2015 | Zhao et al. |
| 2015/0199401 | A1 | 7/2015 | Polehn et al. |
| 2015/0267501 | A1 | 9/2015 | Al-Gouhi |
| 2016/0032696 | A1 | 2/2016 | Caccialupi et al. |
| 2016/0137912 | A1 | 5/2016 | Sherman et al. |
| 2016/0138359 | A1 | 5/2016 | Zhao et al. |
| 2016/0194933 | A1 | 7/2016 | O'Brien et al. |
| 2016/0201425 | A1 | 7/2016 | Walton et al. |
| 2016/0215604 | A1 | 7/2016 | Potapenko |
| 2016/0230495 | A1 | 8/2016 | Mazyar et al. |
| 2016/0319633 | A1 | 11/2016 | Cooper et al. |
| 2016/0376869 | A1 | 12/2016 | Rochen et al. |
| 2017/0122062 | A1 | 5/2017 | Freyer |
| 2018/0087346 | A1 | 3/2018 | Rochen |
| 2018/0266215 | A1 | 9/2018 | Fagley, IV et al. |
| 2018/0355691 | A1 | 12/2018 | Andersen |
| 2018/0355693 | A1 | 12/2018 | Al-AbdulJabbar et al. |
| 2019/0055839 | A1 | 2/2019 | Skillingstad et al. |
| 2019/0203101 | A1 | 7/2019 | Dusterhoft et al. |
| 2020/0240235 | A1 | 7/2020 | Fripp et al. |
| 2020/0325749 | A1 | 10/2020 | Fripp et al. |
| 2020/0370391 | A1 | 11/2020 | Fripp et al. |

FOREIGN PATENT DOCUMENTS

| | | |
|---|---|---|
| EP | 2753791 B1 | 6/2017 |
| GB | 2416796 A | 2/2006 |
| GB | 2514195 B | 6/2019 |
| WO | 2008079486 A1 | 7/2008 |
| WO | 2014210283 A1 | 12/2014 |
| WO | 2016171666 A1 | 10/2016 |
| WO | 2018005740 A1 | 1/2018 |
| WO | 2018057361 A1 | 3/2018 |
| WO | 2019094044 A1 | 5/2019 |
| WO | 2019147285 A1 | 8/2019 |
| WO | 2019164492 A1 | 8/2019 |
| WO | 2019164499 A1 | 8/2019 |
| WO | 2020005252 A1 | 1/2020 |
| WO | 2020018110 A1 | 1/2020 |

OTHER PUBLICATIONS

Written Opinion and Search Report in SG Appln No. 11202000316S, dated Aug. 30, 2021.
Dutch Search Report in NL Appln No. 2026737, dated Aug. 13, 2021.
Examination Report in GCC Appln No. GC 2020-39914, dated Jul. 29, 2021.
Search Report in FR Application No. 1859379, dated Oct. 15, 2019.
International Search Report and Written Opinion dated Nov. 19, 2018; International PCT Application No. PCT/US2018/019337.
Denmark Examination Report and Search Report dated Mar. 16, 2021, Denmark Application No. PA202070389.
International Search Report and Written Opinion dated Jul. 8, 2020, issued in related International Application No. PCT/US2019/056814.
International Search Report and Written Opinion for corresponding PCT International Application No. PCT/US2019/068497; dated Sep. 17, 2020.
International Search Report and Written Opinion for corresponding International Patent Application No. PCT/US2019/062225, dated Aug. 11, 2020.
International Search report and Written Opinion issued in related PCT/US2019/068493 dated Sep. 15, 2020.
Nemisis Annulus Swellable Packer, Weatherford, Swellable Products, 2009-2011.
International Search Report and Written Opinion dated Nov. 22, 2019; International PCT Application No. PCT/US2019/019210.
International Search Report and Witten Opinion dated May 20, 2020, issued in related PCT/US2019/047529.
Tao, Solid expandable tubular patching technique for high-temperature and high-pressure casing damaged wells, Research Paper, Jun. 2015, pp. 408-409, Petroleum Exploration and Development, vol. 42, Issue 3.
Dutch Search Report issued in NL 2026726, dated Aug. 13, 2021.

(56) References Cited

OTHER PUBLICATIONS

International Search Report and Written Opinion dated Sep. 8, 2021 in PCT/US2020/066193.
Search Report and Written Opinion issued in NL2026329, dated Aug. 13, 2021.

* cited by examiner

SWELLABLE METAL FOR NON-ELASTOMERIC O-RINGS, SEAL STACKS, AND GASKETS

TECHNICAL FIELD

The present disclosure relates to the use of swellable metals as non-elastomeric O-rings, seal stacks, and gaskets, and more particularly, to the use of swellable metals as non-elastomeric O-rings, seal stacks, and gaskets in downhole tools for forming seals after exposure to brines.

BACKGROUND

Sealing elements such as O-rings, seal stacks, and gaskets may be used, among other reasons, for forming seals in and around downhole tools. These sealing elements may restrict fluid and/or pressure communication at the seal interface. Forming seals may be an important part of wellbore operations at all stages of drilling, completion, and production.

O-rings, seal stacks, and gaskets are types of sealing elements. Gaskets are generally mechanical seals that fill the space between two or more mating surfaces. Gaskets may be made from many types of materials, but are typically produced from materials that allow for deformation when compressed such as elastomers.

O-rings are a species of mechanical gasket that are circular in shape and have round cross-sections. Typically, an O-ring is seated in a groove or cut-out between two or more adjacent components. When compressed the O-ring expands into any surrounding void space to form a seal at the interface of the O-ring.

Seal stacks are stacks or sealing elements that are shaped to pair together with the adjacent sealing elements in the seal stack. Seal stacks may be used to form dynamic seals or to achieve sealing arrangements not possible with the use of single sealing elements. The individual sealing elements within the seal stack may be used to energize the adjacent sealing elements within the seal stack.

Many species of sealing elements comprise elastomeric materials to form seals. Elastomeric materials, such as rubber, may degrade in high-salinity and/or high-temperature environments. Further, elastomeric sealing elements may lose resiliency over time resulting in failure or necessitating repeated replacement. Some materials used as sealing elements may also require precision machining to ensure that surface contact at the interface of the sealing element is optimized. As such, materials that do not have a good surface finish, for example, rough or irregular surfaces having cuts, gaps, and the like, may not be sufficiently sealed by these materials.

If sealing elements fail, for example, due to degradation from high salinity and/or high temperature environments, wellbore operations may have to be halted, resulting in a loss of productive time and the need for additional expenditure to mitigate damage and correct the failed sealing element.

BRIEF DESCRIPTION OF THE DRAWINGS

Illustrative examples of the present disclosure are described in detail below with reference to the attached drawing figures, which are incorporated by reference herein, and wherein.

Figure 1:
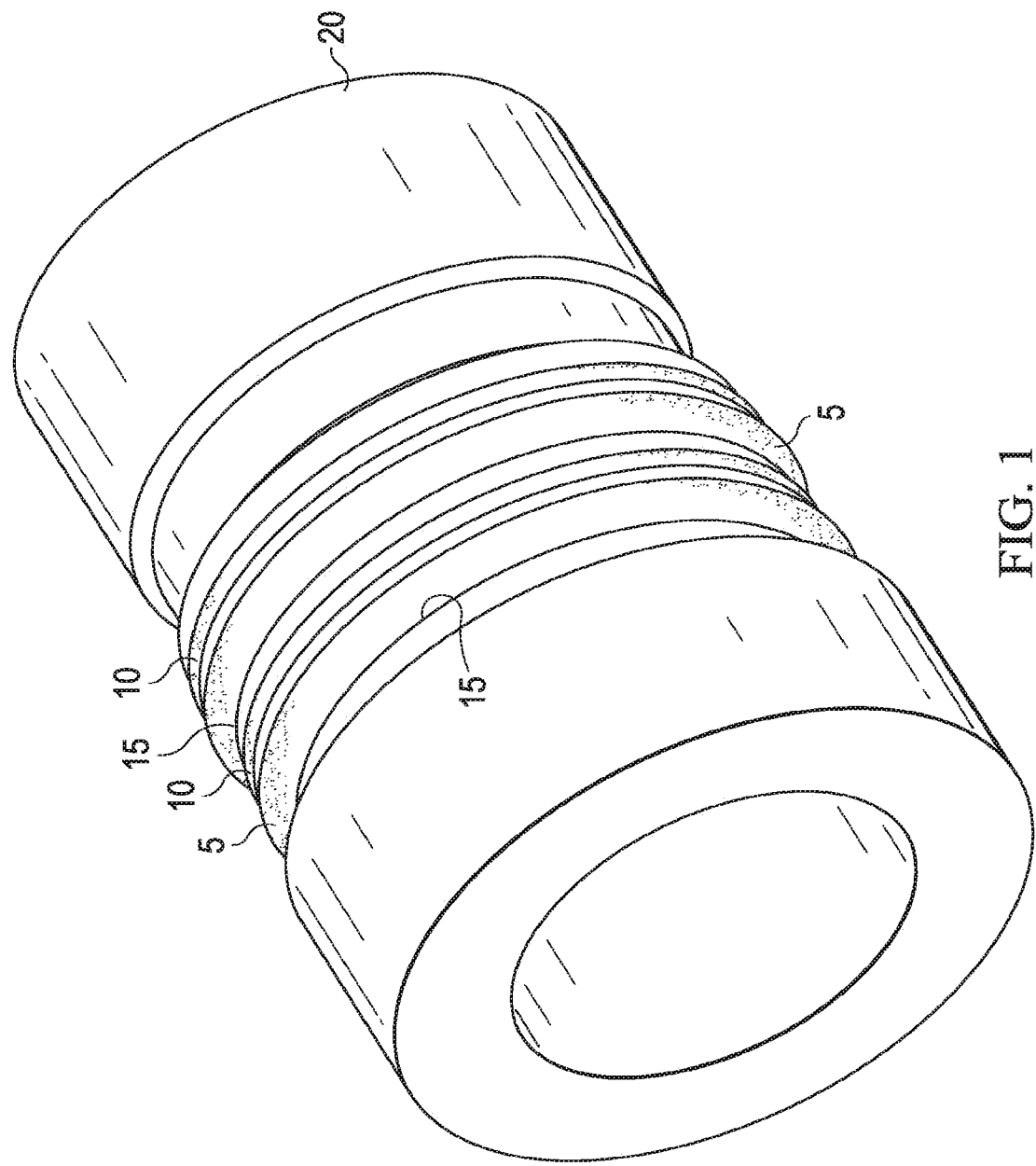
FIG. 1 is an isometric illustration of an example of two sealing elements, an O-ring and a back-up ring, in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of swellable metals as non-elastomeric O-rings, seal stacks, and gaskets, more particularly, to the use of swellable metals as non-elastomeric O-rings, seal stacks, and gaskets in downhole tools for forming seals after exposure to brines.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein relate to the use of non-elastomeric sealing elements comprising swellable metals. As used herein, "sealing elements" refers to O-rings, seal stacks, gaskets, or a combination thereof. The swellable metals may swell in brines and create a seal at the interface of the sealing element and adjacent surfaces. By "swell," "swelling," or "swellable" it is meant that the swellable metal increases its volume. Advantageously, the non-elastomeric sealing elements may be used on roughly finished surfaces, corroded surfaces, or 3-D printed parts. Yet a further advantage is that the swellable metals may swell in high-salinity and/or high-temperature environments where the use of elastomeric materials, such as rubber, can perform poorly. The swellable metals comprise a wide variety of metals and metal alloys and may swell by the formation of metal hydroxides. The swellable metal sealing elements may be used as replacements for other types of sealing elements (i.e. non-swellable metal sealing elements, elastomeric sealing elements, etc.) in downhole tools or as backups for other types of sealing elements in downhole tools.

The swellable metals swell by undergoing metal hydration reactions in the presence of brines to form metal hydroxides. The metal hydroxide occupies more space than the base metal reactant. This expansion in volume allows the swellable metal to form a seal at the interface of the swellable metal and any adjacent surfaces. For example, a mole of magnesium has a molar mass of 24 g/mol and a density of 1.74 g/cm$^3$ which results in a volume of 13.8 cm$^3$/mol. Magnesium hydroxide has a molar mass of 60 g/mol and a density of 2.34 g/cm$^3$ which results in a volume of 25.6 cm$^3$/mol. 25.6 cm$^3$/mol is 85% more volume than 13.8 cm$^3$/mol. As another example, a mole of calcium has a molar mass of 40 g/mol and a density of 1.54 g/cm$^3$ which results in a volume of 26.0 cm$^3$/mol. Calcium hydroxide has a molar mass of 76 g/mol and a density of 2.21 g/cm$^3$ which results in a volume of 34.4 cm$^3$/mol. 34.4 cm$^3$/mol is 32% more volume than 26.0 cm$^3$/mol. As yet another example, a mole of aluminum has a molar mass of 27 g/mol and a density of 2.7 g/cm$^3$ which results in a volume of 10.0 cm$^3$/mol. Aluminum hydroxide has a molar mass of 63 g/mol and a density of 2.42 g/cm$^3$ which results in a volume of 26 cm$^3$/mol. 26 cm$^3$/mol is 160% more volume than 10 cm$^3$/mol. The swellable metal comprises any metal or metal alloy that may undergo a hydration reaction to form a metal hydroxide of greater volume than the base metal or metal alloy reactant.

Examples of suitable metals for the swellable metal include, but are not limited to, magnesium, calcium, aluminum, iron, nickel, copper, chromium, tin, zinc, lead, beryllium, gold, silver, lithium, sodium, potassium, rubidium, cesium, strontium, barium, gallium, indium, thallium, bismuth, scandium, titanium, vanadium, manganese, cobalt, yttrium, zirconium, niobium, molybdenum, ruthenium, rhodium, palladium, praseodymium, lanthanum, hafnium, tantalum, tungsten, terbium, rhenium, osmium, iridium, platinum, neodymium, gadolinium, erbium, or any combination thereof. Preferred metals include magnesium, calcium, and aluminum.

Examples of suitable metal alloys for the swellable metal include, but are not limited to, any alloys of magnesium, calcium, aluminum, iron, nickel, copper, chromium, tin, zinc, lead, beryllium, gold, silver, lithium, sodium, potassium, rubidium, cesium, strontium, barium, gallium, indium, thallium, bismuth, scandium, titanium, vanadium, manganese, cobalt, yttrium, zirconium, niobium, molybdenum, ruthenium, rhodium, palladium, praseodymium, lanthanum, hafnium, tantalum, tungsten, terbium, rhenium, osmium, iridium, platinum, neodymium, gadolinium, and erbium. Preferred metal alloys include, alloys of magnesium-zinc-zirconium or aluminum-nickel. In some examples, the metal alloys may comprise alloyed elements that are not metallic. Examples of these non-metallic elements include, but are not limited to, graphite, carbon, silicon, boron nitride, and the like. In some examples, the metal is alloyed to increase reactivity or to control the formation of oxides.

In some examples, the metal alloy is also alloyed with a dopant metal that promotes corrosion or inhibits passivation and thus increased hydroxide formation. Examples of dopant metals include, but are not limited to, nickel, iron, copper, carbon, titanium, gallium, mercury, cobalt, iridium, gold, palladium, or any combination thereof.

In examples where the swellable metal comprises a metal alloy, the metal alloy may be produced from a solid solution process or a powder metallurgical process. The sealing element comprising the metal alloy may be formed either from the metal alloy production process or through subsequent processing of the metal alloy.

As used herein, the term "solid solution" refers to an alloy that is formed from a single melt where all of the components in the alloy (e.g., a magnesium alloy) are melted together in a casting. The casting can be subsequently extruded, wrought, hipped, or worked to form the desired shape for the sealing element of the swellable metal. Preferably, the alloying components are uniformly distributed throughout the metal alloy, although intra-granular inclusions may be present, without departing from the scope of the present disclosure. It is to be understood that some minor variations in the distribution of the alloying particles can occur, but that it is preferred that the distribution is such that a homogenous solid solution of the metal alloy is produced. A solid solution is a solid-state solution of one or more solutes in a solvent. Such a mixture is considered a solution rather than a compound when the crystal structure of the solvent remains unchanged by addition of the solutes, and when the mixture remains in a single homogeneous phase.

A powder metallurgy process generally comprises obtaining or producing a fusible alloy matrix in a powdered form. The powdered fusible alloy matrix is then placed in a mold or blended with at least one other type of particle and then placed into a mold. Pressure is applied to the mold to compact the powder particles together, fusing them to form a solid material which may be used as the swellable metal.

In some alternative examples, the swellable metal comprises an oxide. As an example, calcium oxide reacts with water in an energetic reaction to produce calcium hydroxide. 1 mole of calcium oxide occupies 9.5 cm$^3$ whereas 1 mole of calcium hydroxide occupies 34.4 cm$^3$ which is a 260% volumetric expansion. Examples of metal oxides include oxides of any metals disclosed herein, including, but not limited to, magnesium, calcium, aluminum, iron, nickel, copper, chromium, tin, zinc, lead, beryllium, gold, silver, lithium, sodium, potassium, rubidium, cesium, strontium, barium, gallium, indium, thallium, bismuth, scandium, titanium, vanadium, manganese, cobalt, yttrium, zirconium, niobium, molybdenum, ruthenium, rhodium, palladium, praseodymium, lanthanum, hafnium, tantalum, tungsten, terbium, rhenium, osmium, iridium, platinum, neodymium, gadolinium, erbium, or any combination thereof.

It is to be understood, that the selected swellable metal is to be selected such that the formed sealing element does not degrade into the brine. As such, the use of metals or metal alloys for the swellable metal that form relatively water-insoluble hydration products may be preferred. For example, magnesium hydroxide and calcium hydroxide have low solubility in water. Alternatively, or in addition to, the sealing element may be positioned in the downhole tool such that degradation into the brine is constrained due to the geometry of the area in which the sealing element is disposed and thus resulting in reduced exposure of the sealing element. For example, the volume of the area in which the sealing element is disposed is less than the expansion volume of the swellable metal. In some examples, the volume of the area is less than as much as 50% of the expansion volume. Alternatively, the volume of the area in which the sealing element may be disposed may be less than 90% of the expansion volume, less than 80% of the expansion volume, less than 70% of the expansion volume, or less than 60% of the expansion volume.

In some examples, the metal hydration reaction may comprise an intermediate step where the metal hydroxides are small particles. When confined, these small particles may lock together to create the seal. Thus, there may be an intermediate step where the swellable metal forms a series of fine particles between the steps of being solid metal and forming a seal.

In some alternative examples, the swellable metal is dispersed into a binder material. The binder may be degradable or non-degradable. In some examples, the binder may be hydrolytically degradable. The binder may be swellable or non-swellable. If the binder is swellable, the binder may be oil-swellable, water-swellable, or oil- and water-swellable. In some examples, the binder may be porous. In some alternative examples, the binder may not be porous. General examples of the binder include, but are not limited to, rubbers, plastics, and elastomers. Specific examples of the binder may include, but are not limited to, polyvinyl alcohol, polylactic acid, polyurethane, polyglycolic acid, nitrile rubber, isoprene rubber, PTFE, silicone, fluoroelastomers, ethylene-based rubber, and PEEK. In some embodiments, the dispersed swellable metal may be cuttings obtained from a machining process.

In some examples, the metal hydroxide formed from the swellable metal may be dehydrated under sufficient swelling pressure. For example, if the metal hydroxide resists movement from additional hydroxide formation, elevated pressure may be created which may dehydrate the metal hydroxide in certain examples. This dehydration may result in the formation of the metal oxide from the swellable metal. As an example, magnesium hydroxide may be dehydrated under sufficient pressure to form magnesium oxide and water. As another example, calcium hydroxide may be dehydrated under sufficient pressure to form calcium oxide and water. As yet another example, aluminum hydroxide may be dehydrated under sufficient pressure to form aluminum oxide and water. The dehydration of the hydroxide forms of the swellable metal may allow the swellable metal to form additional metal hydroxide and continue to swell.

The sealing elements may be used to form a seal at the interface of the sealing element and an adjacent rough surface finish component. A "rough surface finish" as used herein, is a surface finish that is not even or consistent at the area where the sealing is to occur. A rough surface finish comprises a surface having any type of indentation or projection, for example, surfaces comprising gashes, gaps, pocks, pits, holes, divots, and the like. Additionally, components produced by additive manufacturing, for example 3-D printed components, may be used with the sealing elements to form seals. Additive manufactured components may not involve precision machining and may, in some examples, comprise a rough surface finish. The sealing elements may expand to fill and seal the imperfect areas of the rough surface finish allowing a seal to be formed between surfaces that typically cannot be sealed with elastomeric sealing elements. Further, the rough surface finish components may also be less expensive than comparable components having precision-machined finishes. Advantageously, the sealing elements may also be used to form a seal at the interface of the sealing element and an irregular surface component. For example, components manufactured in segments or split with scarf joints, butt joints, splice joints, etc. may be sealed, and the hydration process of the swellable metals may be used to close the gaps in the irregular surface. As such, the swellable metal sealing elements may be viable sealing options for difficult to seal surfaces.

As described above, the sealing elements are produced from swellable metals and as such, are non-elastomeric materials except for the specific examples that further comprise an elastomeric binder for the swellable metals. As non-elastomeric materials, the sealing elements do not possess elasticity and therefore the sealing elements irreversibly swell when contacted with a brine. The sealing elements do not return to their original size or shape even after the brine is removed from contact. In examples comprising an elastomeric binder, the elastomeric binder may return to its original size or shape; however, any swellable metal dispersed therein would not.

The brine may be saltwater (e.g., water containing one or more salts dissolved therein), saturated saltwater (e.g., saltwater produced from a subterranean formation), seawater, fresh water, or any combination thereof. Generally, the brine may be from any source. The brine may be a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some examples, the salinity of the brine may exceed 10%. In said examples, use of elastomeric sealing elements may be impacted. Advantageously, the swellable metal sealing elements of the present disclosure are not impacted by contact with high-salinity brines. One of ordinary skill in the art, with the benefit of this disclosure, should be readily able to select a brine for a chosen application.

The sealing elements may be used in high-temperature formations, for example, in formations with zones having temperatures equal to or exceeding 350° F. In these high-temperature formations, use of elastomeric sealing elements may be impacted. Advantageously, the swellable metal sealing elements of the present disclosure are not impacted by use in high-temperature formations. In some examples, the sealing elements of the present disclosure may be used in high-temperature formations and with high-salinity brines. In a specific example, a swellable metal sealing element may be used to form a seal for a downhole tool by swelling after contact with a brine having a salinity of 10% or greater and also while being disposed in a wellbore zone having a temperature equal to or exceeding 350° F.

FIG. 1 is an isometric illustration of an example of two sealing elements, an O-ring 5 and a back-up ring 10. The O-ring 5 comprises a swellable metal as disclosed and described herein. The back-up ring 10 comprises a swellable metal as disclosed and described herein. In some alternative examples, the back-up ring 10 may be a back-up ring for a sealing element that does not comprise a swellable metal. The O-ring 5 and back-up ring 10 may be placed in grooves 15 on the exterior of a conduit 20. The conduit 20 may be any type of conduit used in a wellbore, including drill pipe, stick pipe, tubing, coiled tubing, etc. The O-ring 5 and back-up ring 10 may also be used on any downhole tool or piece of wellbore equipment and may substitute for any elastomeric O-ring or back-up ring used in a downhole tool or piece of wellbore equipment. When exposed to a brine, the O-ring 5 and back-up ring 10 may swell and form a seal at the interface of the O-ring 5 or back-up ring 10 and any adjacent surface, including adjacent surfaces that comprise rough surface finishes and/or are irregular. In alternative examples, the O-ring 5 and back-up ring 10 may comprise a binder with a swellable metal dispersed therein. The binder may be any binder disclosed herein.

Figure 2:
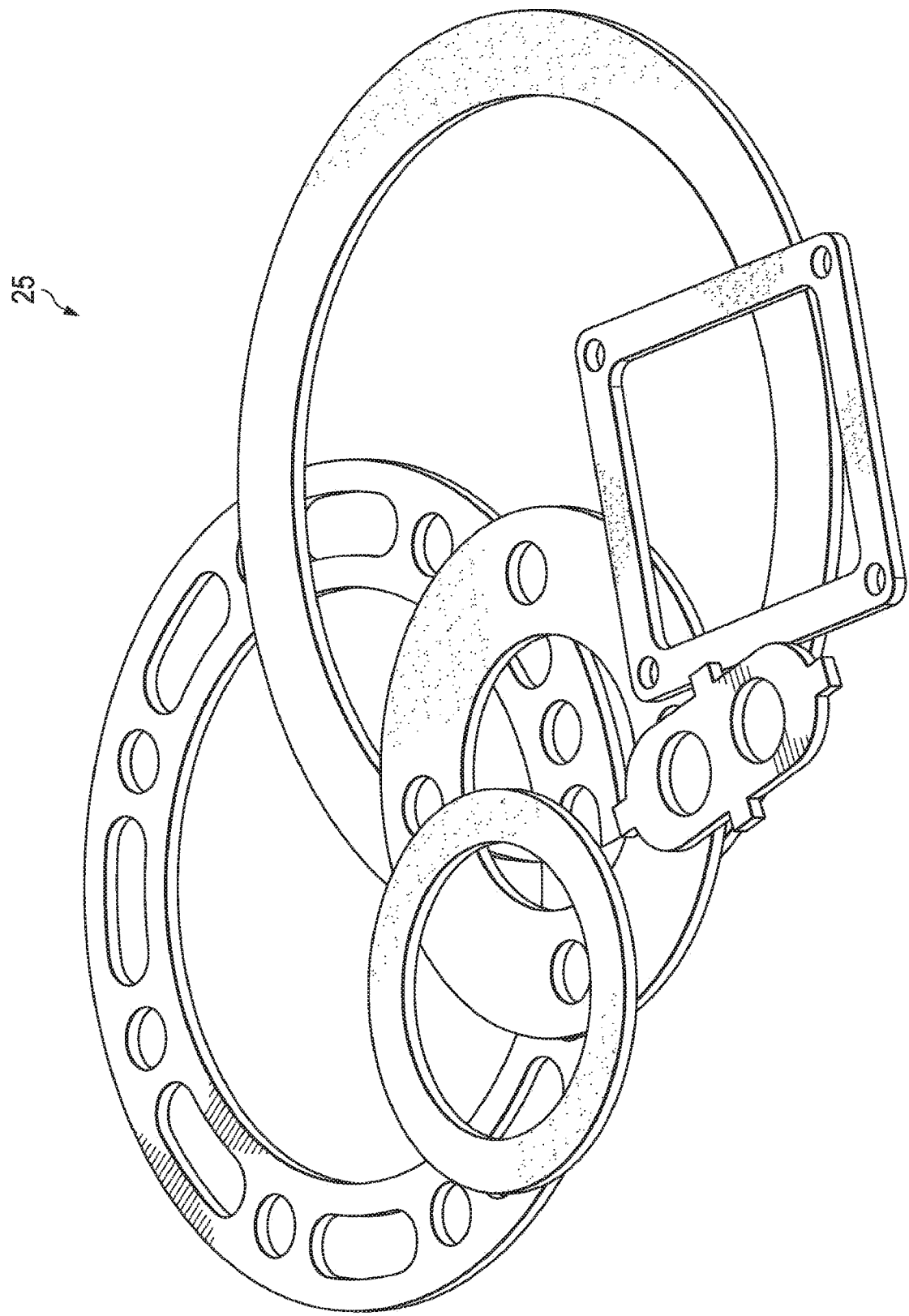
FIG. 2 is an isometric illustration of a variety of gasket sealing elements in accordance with the examples disclosed herein.

FIG. 2 is an isometric illustration of a variety of sealing elements referred to as gaskets, generally 25. The gaskets 25 may comprise a variety of shapes including circles, rectangles, squares, ovals, etc. The gaskets 25 may comprise a variety of cross-sectional shapes including circles, rectangles, squares, ovals, etc. Further, the gaskets 25 may comprise cut-out sections which may allow for a gasket 25 to be placed over bolts or other connecting members which may be disposed in the profile of adjacent components. In some examples, gaskets 25 may comprise gaps, cuts, joints, and/or segmented portions. The gaskets 25 comprise a swellable metal as disclosed and described herein. The gaskets 25 may be used on any downhole tool or piece of wellbore equipment and may substitute for any elastomeric gasket used in a downhole tool or piece of wellbore equipment. When exposed to a brine, a gasket 25 may swell and form a seal at the interface of the gasket 25 and any adjacent surface, including adjacent surfaces that comprise rough surface finishes and/or are irregular. In alternative examples, a gasket 25 may comprise a binder with a swellable metal dispersed therein. The binder may be any binder disclosed herein.

Figure 3:
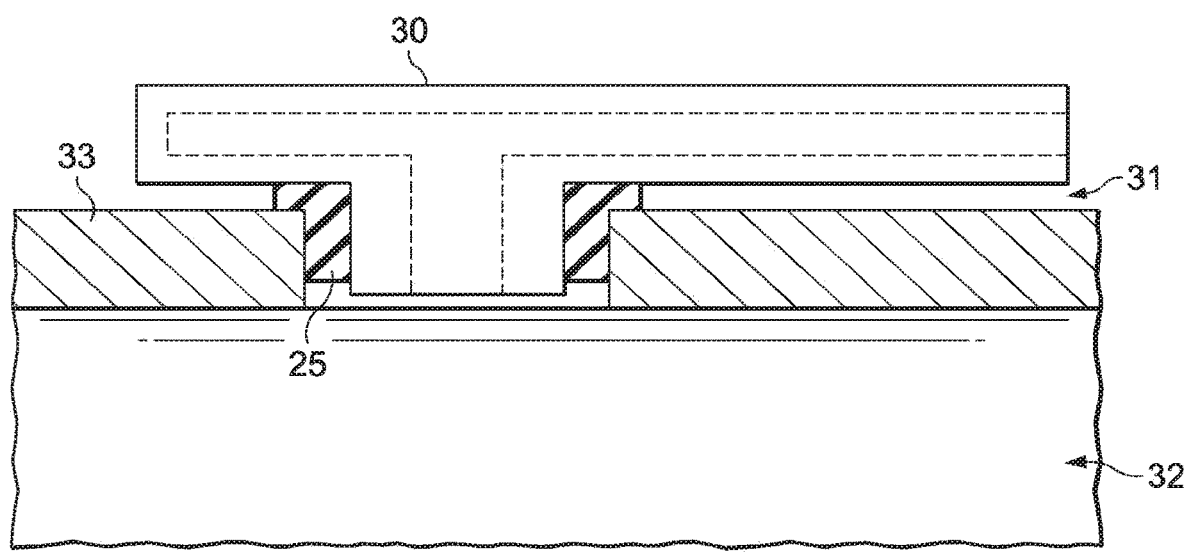
FIG. 3 is a cross-sectional illustration of a gasket disposed around an inflow control device in accordance with the examples disclosed herein.

FIG. 3 is a cross-sectional illustration of a gasket 25 disposed around an inflow control device 30. When exposed to a brine, a gasket 25 may swell and form a seal in a flow path 31 of the inflow control device 30. The seal may prevent or reduce inflow of wellbore fluids into the interior 32 of a wellbore conduit 33. The inflow control device 30 may be any inflow control device, autonomous inflow control device, or other flow restriction as known in the art. As such, a gasket 25 may prevent the flow of a wellbore fluid into the interior 32 of the wellbore conduit 33 without first flowing through the interior of the inflow control device 30.

Figure 4:
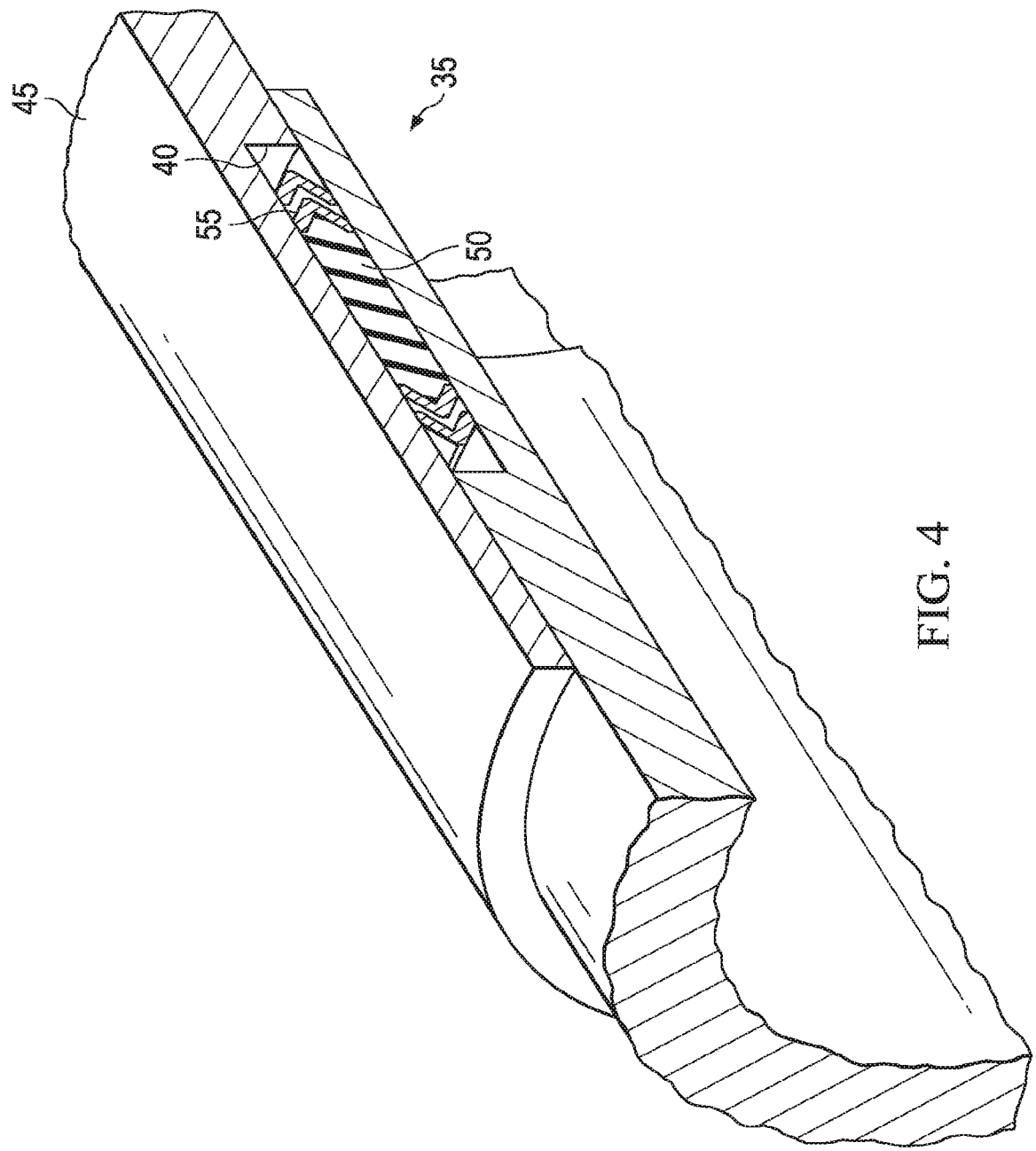
FIG. 4 is an isometric illustration of a seal stack disposed in a gap between two adjacent downhole tools in accordance with the examples disclosed herein.

FIG. 4 is an isometric illustration of a seal stack, generally 35, disposed in a gap 40 between two adjacent downhole tools 45. The seal stack 35 comprises a shaped sealing element 50 and a multiple of chevron packing seals 55. The shaped sealing element 50 comprises a swellable metal as disclosed and described herein. The shaped sealing element 50 is shaped such to interact with and energize the chevron packing seals 55. The chevron packing seals 55 may comprise elastomeric materials. The seal stack 35 may be used with any downhole tool 45 or piece of wellbore equipment having a seal stack, and may substitute for any traditional seal stack used in said downhole tool 45 or piece of wellbore equipment. When exposed to a brine, the shaped sealing element 50 may swell and contact the chevron packing seals 55, energizing them to form seals at their respective interfaces. In alternative examples, shaped sealing element 50 may comprise a binder with the swellable metal dispersed therein. The binder may be any binder disclosed herein.

Figure 5:
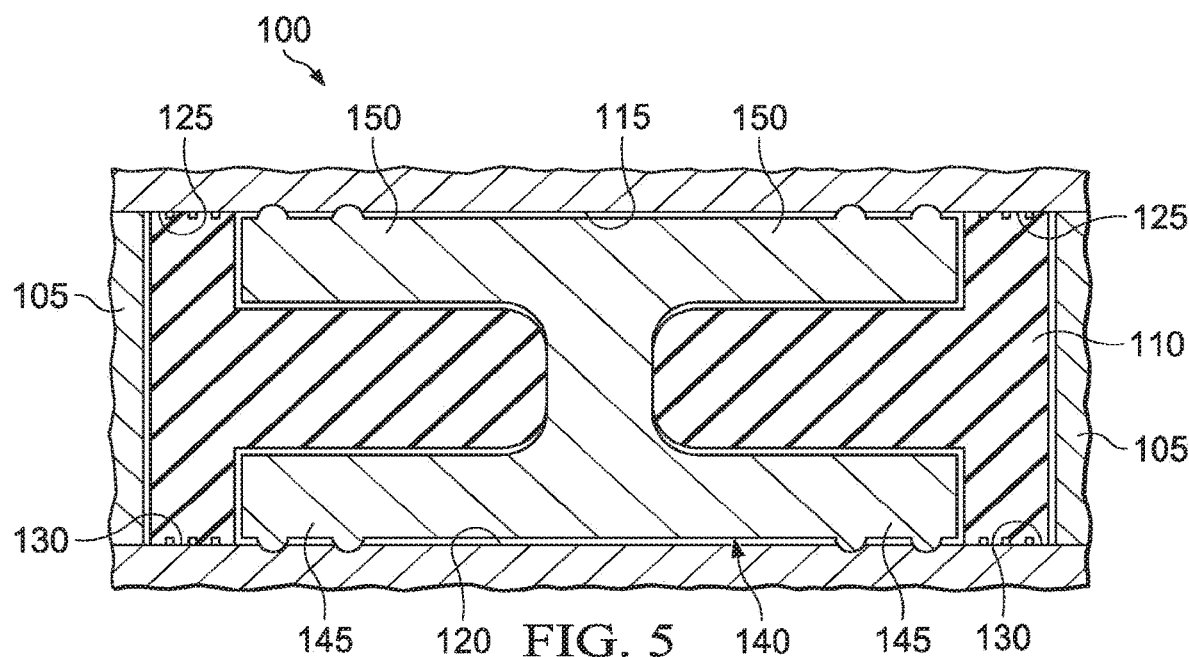
FIG. 5 illustrates a cross-sectional illustration of a closure mechanism comprising a seal stack and disposed in a downhole tool in accordance with the examples disclosed herein.

FIG. 5 is a cross-sectional illustration of a closure mechanism, generally 100, disposed in a downhole tool. The closure mechanism 100 comprises a seal stack, generally 105. The seal stack 105 comprises a shaped sealing element 110, which may be used to energize metal-to-metal seals at a first cylindrical sealing surface 115 and a second cylindrical sealing surface 120. Further, the shaped sealing element 110 may seal a first swellable metal sealing surface 125 and a second swellable metal sealing surface 130. In addition to the shaped sealing element 110, the seal stack 105 further comprises a metal-to-metal sealing element 140. The shaped sealing element 110 comprises a swellable metal as disclosed and described herein. The shaped sealing element 110 is shaped such to interact with and energize the metal-to-metal sealing element 140. The metal-to-metal sealing element 140 may comprise swellable metals as disclosed herein or may not comprise swellable metals and as such, may not swell if exposed to a brine. Metal-to-metal sealing element 140 comprises metal arms 145 and 150. When exposed to a brine, the shaped sealing element 110 may swell and apply pressure to the metal-to-metal sealing element 140, energizing the metal-to-metal sealing element 140 by biasing the metal arms 145 and 150 radially outward to form metal-to-metal seals at the respective interfaces of the first cylindrical sealing surface 115 and at the second cylindrical sealing surface 120. Further, the shaped sealing element 110 may form metal-to-metal seals at the first swellable metal sealing surface 125 and the second swellable metal sealing surface 130. In alternative examples, the shaped sealing element 110 may comprise a binder with a swellable metal dispersed therein. The binder may be any binder disclosed herein.

Figure 6:
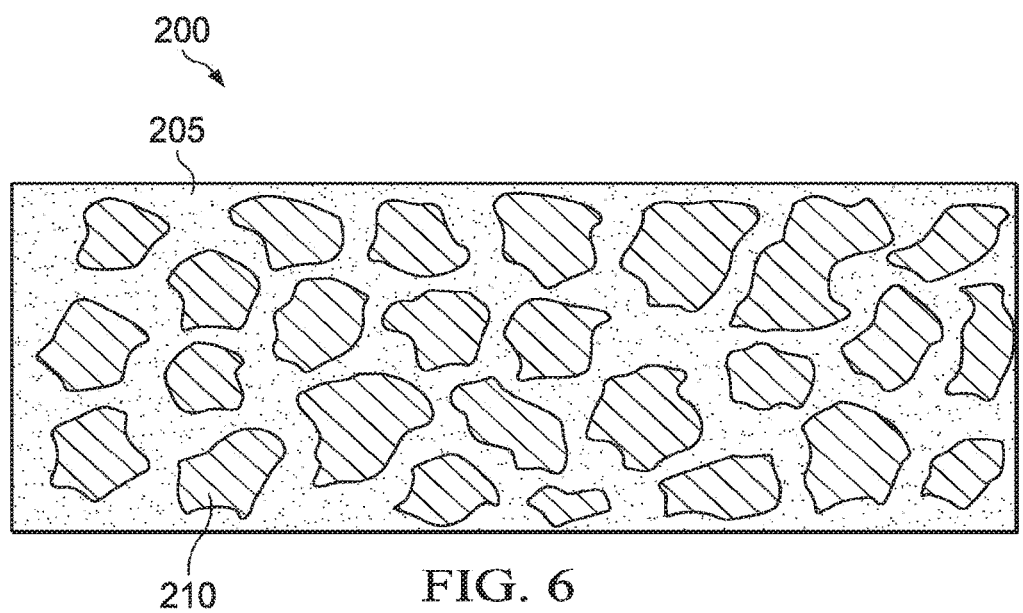
FIG. 6 is a cross-sectional illustration of a portion of a sealing element comprising a binder having a swellable metal dispersed therein in accordance with the examples disclosed herein.

FIG. 6 is a cross-sectional illustration of a portion of a sealing element, generally 200, comprising a binder 205 and having a swellable metal 210 dispersed therein. As illustrated, the swellable metal 210 may be distributed within the binder 205. The distribution may be homogenous or non-homogenous. The swellable metal 210 may be distributed within the binder 205 using any suitable method. Binder 205 may be any binder material as described herein. Binder 205 may be non-swelling, oil-swellable, water-swellable, or oil- and water-swellable. Binder 205 may be degradable. Binder 205 may be porous or non-porous. The sealing element 200 comprising binder 205 and having a swellable metal 210 dispersed therein may be used in place of any sealing element described herein and depicted in any of the FIGURES. In one embodiment, the swellable metal 210 may be mechanically compressed and the binder 205 may be cast around the compressed swellable metal 210 in a desired shape.

It should be clearly understood that the examples illustrated by FIGS. 1-6 are merely general applications of the principles of this disclosure in practice, and a wide variety of other examples are possible. Therefore, the scope of this disclosure is not limited in any manner to the details of any of the FIGURES described herein.

It is also to be recognized that the disclosed sealing elements may also directly or indirectly affect the various downhole equipment and tools that may come into contact with the sealing elements during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in any of the FIGURES.

Provided are methods for forming a seal in a wellbore in accordance with the disclosure and the illustrated FIGURES. An example method comprises providing a swellable metal sealing element selected from the group consisting of an O-ring, a gasket, or a seal stack; wherein the swellable metal sealing element is disposed in or around a downhole tool disposed in the wellbore. The method further comprises exposing the swellable metal sealing element to a brine and allowing or causing to allow the swellable metal sealing element to swell.

Additionally or alternatively, the method may include one or more of the following features individually or in combination. The swellable metal sealing element may comprise a metal selected from the group consisting of magnesium, calcium, aluminum, and any combination thereof. The swellable metal sealing element may comprise a metal alloy comprising a metal selected from the group consisting of magnesium, calcium, aluminum, and any combination thereof. The downhole tool may comprise a sealing surface adjacent to the swellable metal sealing element; wherein the sealing surface comprises an indentation or projection at the area of the sealing surface adjacent to the swellable metal sealing element. The downhole tool may comprise a sealing surface adjacent to the swellable metal sealing element; wherein the sealing surface comprises segments, scarf joints, butt joints, splice joints, or a combination thereof. The downhole tool may comprise a sealing surface adjacent to the swellable metal sealing element; wherein the sealing surface was produced by additive manufacturing. The swellable metal sealing element may comprise a binder. The swellable metal sealing element may comprise a metal oxide. The downhole tool may be disposed in a wellbore zone having a temperature greater than 350° F. The brine may comprise a salinity greater than 10%. The downhole tool may be an inflow control device.

Provided are swellable metal sealing elements for forming a seal in a wellbore in accordance with the disclosure and the illustrated FIGURES. An example swellable metal sealing element comprises a swellable metal seal stack comprising: a sealing element; wherein the sealing element is not a swellable metal sealing element, and a swellable metal sealing element adjacent to the sealing element.

Additionally or alternatively, the swellable metal sealing elements may include one or more of the following features individually or in combination. The swellable metal sealing element may comprise a metal selected from the group consisting of magnesium, calcium, aluminum, and any combination thereof. The swellable metal sealing element may comprise a metal alloy comprising a metal selected from the group consisting of magnesium, calcium, aluminum, and any combination thereof. The sealing element may be an elastomeric chevron packing seal configured to be energized by the swellable metal sealing element. The sealing element may be a metal sealing element configured to be energized by the swellable metal sealing element to make a metal-to-metal seal. The swellable metal sealing element may comprise a binder. The swellable metal sealing element may comprise a metal oxide.

Provided are systems for reducing fluid communication into a tubular in accordance with the disclosure and the illustrated FIGURES. An example system comprises an inflow control device comprising a flow path between an annulus and the interior of the tubular; the tubular coupled to the inflow control device; and a swellable metal sealing element at least partially disposed in the flow path.

Additionally or alternatively, the system may include one or more of the following features individually or in combination. The swellable metal sealing element may comprise a metal selected from the group consisting of magnesium, calcium, aluminum, and any combination thereof. The swellable metal sealing element may comprise a metal alloy comprising a metal selected from the group consisting of magnesium, calcium, aluminum, and any combination thereof. The swellable metal sealing element may comprise a binder. The swellable metal sealing element may comprise a metal oxide. The inflow control device may be disposed in a wellbore zone having a temperature of greater than 350° F. The inflow control device tool may comprise a sealing surface adjacent to the swellable metal sealing element; wherein the sealing surface comprises an indentation or projection at the area of the sealing surface adjacent to the swellable metal sealing element. The inflow control device may comprise a sealing surface adjacent to the swellable metal sealing element; wherein the sealing surface comprises segments, scarf joints, butt joints, splice joints, or a combination thereof. The inflow control device may comprise a sealing surface adjacent to the swellable metal sealing element; wherein the sealing surface was produced by additive manufacturing.

EXAMPLES

The present disclosure may be better understood by reference to the following examples, which are offered by way of illustration. The present disclosure is not limited to the examples provided herein.

Example 1

Figure 7:
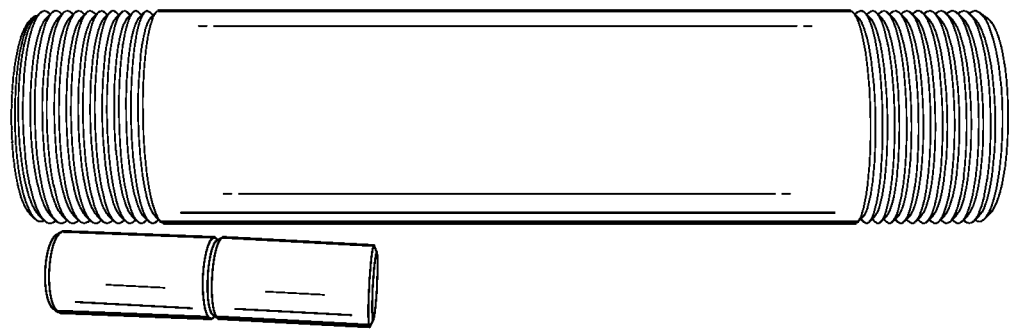
FIG. 7 is a photograph illustrating a top-down view of two sample swellable metal rods and a piece of tubing in accordance with the examples disclosed herein.
Figure 8:
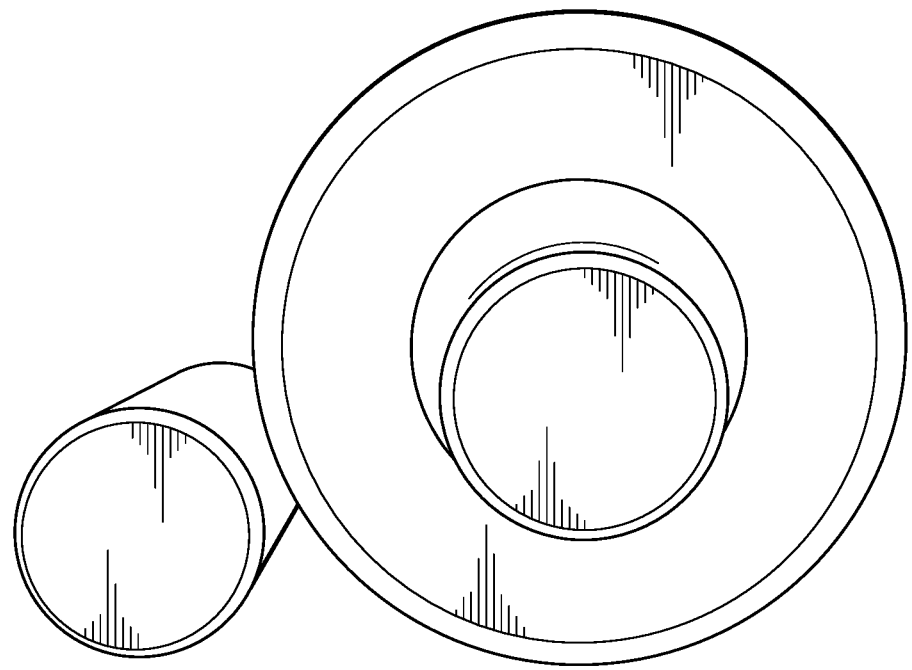
FIG. 8 is a photograph illustrating a side view of the sample swellable metal rod of FIG. 7 inserted into the piece of tubing and further illustrating the extrusion gap between the sample swellable metal rod and the piece of tubing in accordance with the examples disclosed herein.

Example 1 illustrates a proof-of-concept experiment to test the swelling of the swellable metal in the presence of a brine. An example swellable metal comprising a magnesium alloy created by a solid solution manufacturing process was prepared as a pair of 1" long metal rods having diameters of 0.5". The rods were placed into a piece of tubing having an inner diameter of 0.625". The rods were exposed to a 20% potassium chloride brine and allowed to swell. FIG. 7 is a photograph illustrating a top-down view of the two sample swellable metal rods and the piece of tubing. FIG. 8 is a photograph illustrating a side view of the sample swellable metal rod of FIG. 7 inserted into the piece of tubing and further illustrating the extrusion gap between the sample swellable metal rod and the piece of tubing.

Figure 9:
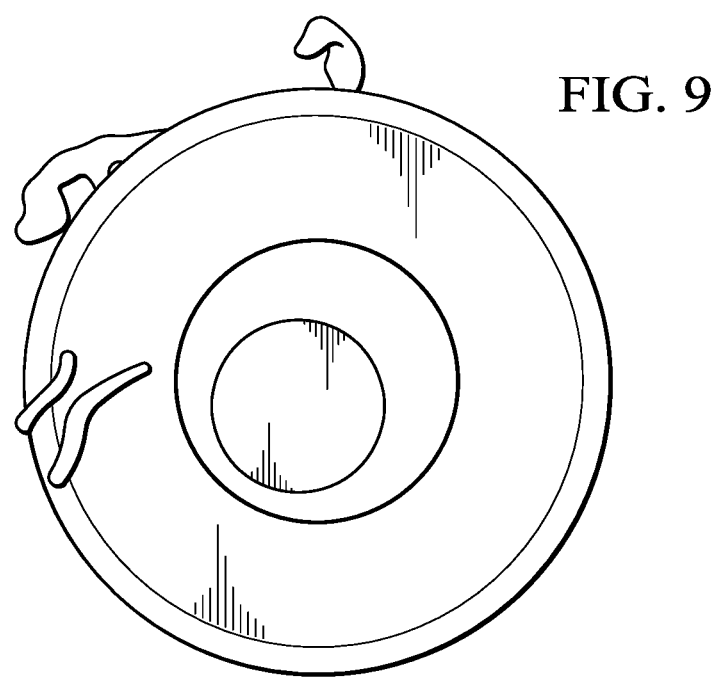
FIG. 9 is a photograph illustrating a side view of the swollen sample swellable metal rod of FIGS. 7 and 8 after sealing the piece of tubing in accordance with the examples disclosed herein.
Figure 10:
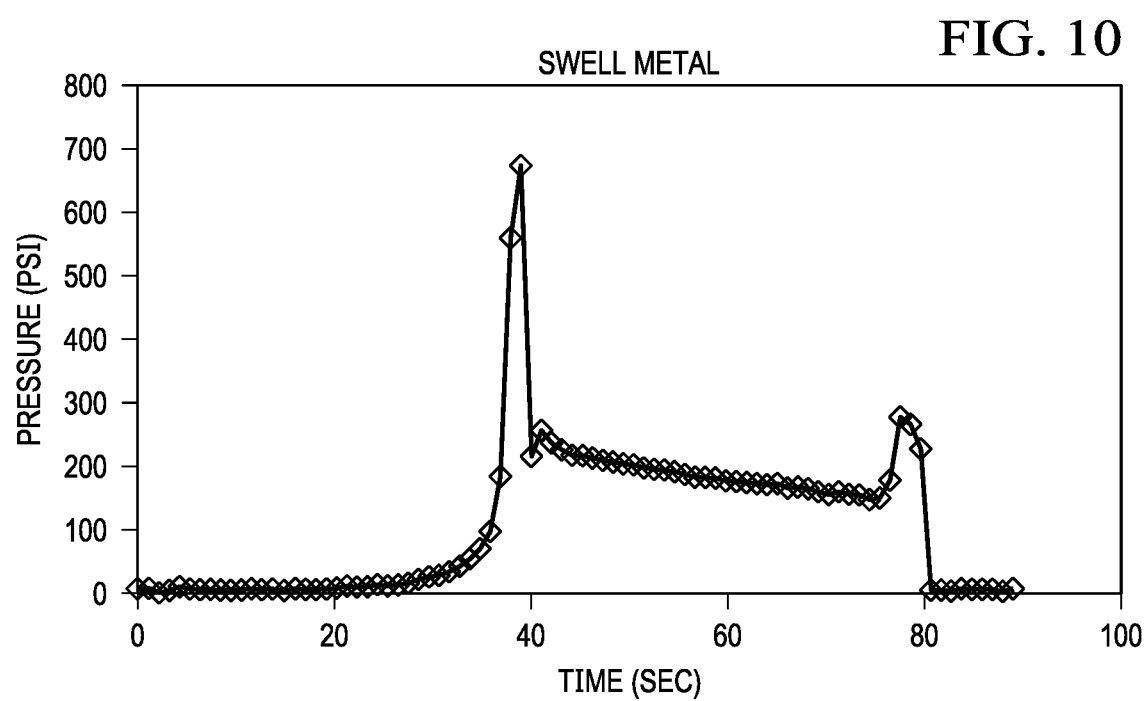
FIG. 10 is a graph charting pressure versus time for the portion of an experiment where the pressure was ramped up within the tubing of FIG. 9 to a sufficient pressure to dislodge the swollen metal rod from the tubing in accordance with the examples disclosed herein.

After swelling, the tubing sample held 300 psi of pressure without leakage. 600 psi of pressure was needed to force the swellable metal to shift in the tubing. As such, without any support the swellable metal was shown to form a seal in the tubing and hold 300 psi with a ⅛" extrusion gap. FIG. 9 is a photograph illustrating a side view of the swollen sample swellable metal rod of FIGS. 7 and 8 after sealing the piece of tubing. FIG. 10 is a graph charting pressure versus time for the portion of the experiment where the pressure was ramped up within the tubing of FIG. 9 to a sufficient pressure to dislodge the swollen metal rod from the tubing.

Figure 11:
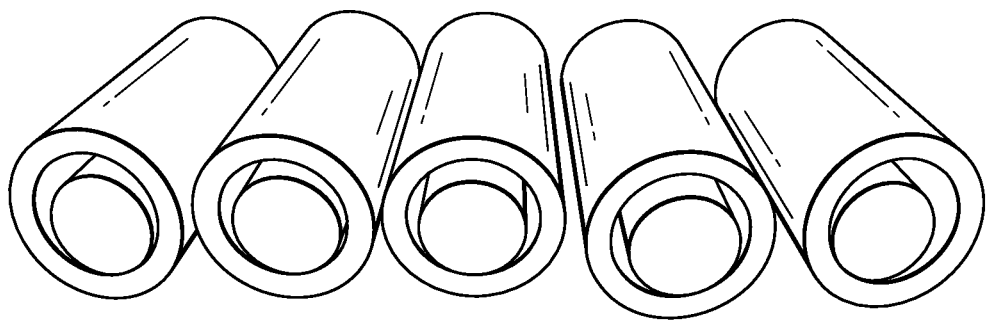
FIG. 11 is a photograph illustrating an isometric view of several sample metal rods disposed within sections of plastic tubing prior to swelling in accordance with the examples disclosed herein.
Figure 12:
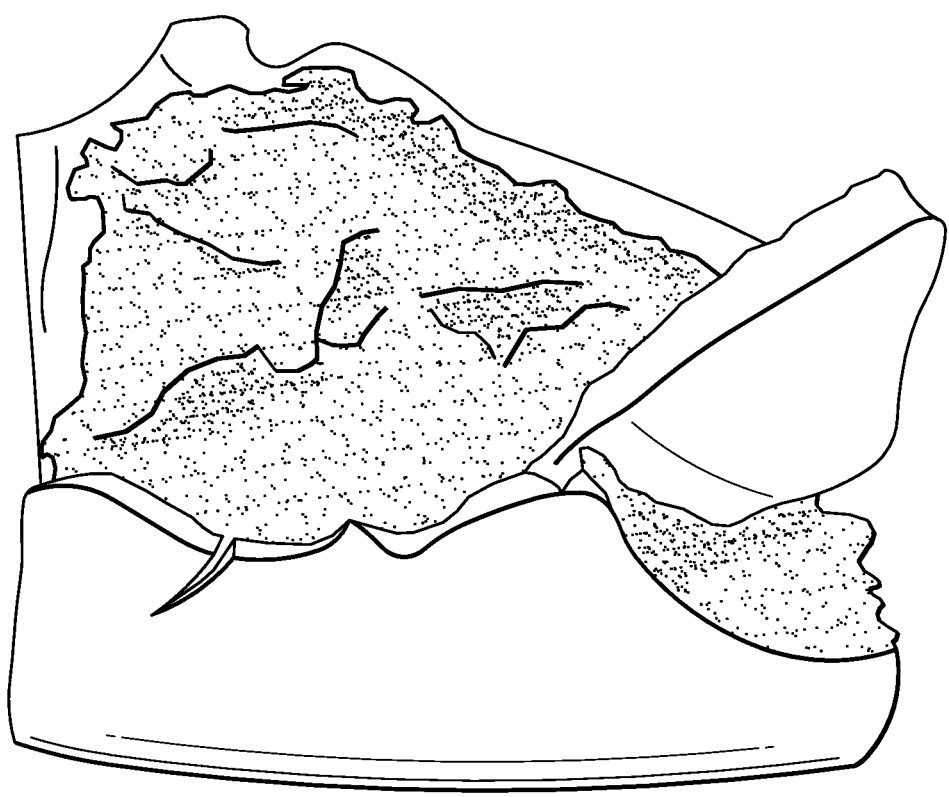
FIG. 12 is a photograph illustrating an isometric view of a swollen sample metal rod which has swollen to a sufficient degree to fracture the section of plastic tubing of FIG. 11 in accordance with the examples disclosed herein.

As a visual demonstration, the same metal rods were placed in PVC tubes, exposed to a 20% potassium chloride brine, and allowed to swell. The swellable metal fractured the PVC tubes. FIG. 11 is a photograph illustrating an isometric view of several sample metal rods disposed within sections of plastic tubing prior to swelling. FIG. 12 is a photograph illustrating an isometric view of a swollen sample metal rod that has swollen to a sufficient degree to fracture the section of plastic tubing of FIG. 11.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for forming a seal in a wellbore comprising:
providing a swellable metal sealing element selected from the group consisting of an O-ring, a gasket, or a seal stack; wherein the swellable metal sealing element is disposed in or around a downhole tool disposed in the wellbore; wherein the swellable metal sealing element consists of a material selected from the group consisting of a metal, metal alloy, metal oxide, and any combination thereof;
exposing the swellable metal sealing element to a brine; and
allowing or causing to allow the swellable metal sealing element to swell.

2. The method of claim 1, wherein the metal is selected from the group consisting of magnesium, calcium, aluminum, and any combination thereof.

3. The method of claim 1, wherein the metal alloy comprises a metal selected from the group consisting of magnesium, calcium, aluminum, and any combination thereof.

4. The method of claim 1, wherein the downhole tool comprises a sealing surface adjacent to the swellable metal sealing element and wherein the sealing surface comprises an indentation or projection at the area of the sealing surface adjacent to the swellable metal sealing element.

5. The method of claim 1, wherein the downhole tool comprises a sealing surface adjacent to the swellable metal sealing element and wherein the sealing surface comprises segments, scarf joints, butt joints, splice joints, or a combination thereof.

6. The method of claim 1, wherein the downhole tool comprises a sealing surface adjacent to the swellable metal sealing element and wherein the sealing surface was produced by additive manufacturing.

7. The method of claim 1, wherein the downhole tool is disposed in a wellbore zone having a temperature greater than 350° F.

8. The method of claim 1, wherein the brine comprises a salinity greater than 10%.

9. The method of claim 1, wherein the downhole tool is an inflow control device.

10. The method of claim 1, wherein the metal oxide comprises a metal selected from the group consisting of magnesium, calcium, aluminum, and any combination thereof.

11. A swellable metal seal stack comprising:
a sealing element; wherein the sealing element is not a swellable metal sealing element, and
a swellable metal sealing element adjacent to the sealing element; wherein the swellable metal sealing element consists of a material selected from the group consisting of a metal, metal alloy, metal oxide, and any combination thereof.

12. The swellable metal seal stack of claim 11, wherein the metal is selected from the group consisting of magnesium, calcium, aluminum, and any combination thereof.

13. The swellable metal seal stack of claim 11, wherein the metal alloy comprises a metal selected from the group consisting of magnesium, calcium, aluminum, and any combination thereof.

14. The swellable metal seal stack of claim 11, wherein the sealing element is an elastomeric chevron packing seal configured to be energized by the swellable metal sealing element.

15. The swellable metal seal stack of claim 11, wherein the sealing element is a metal sealing element configured to be energized by the swellable metal sealing element to make a metal-to-metal seal.

16. The swellable metal seal stack of claim 11, wherein the metal oxide comprises a metal selected from the group consisting of magnesium, calcium, aluminum, and any combination thereof.

17. A system for reducing fluid communication into a tubular comprising:
an inflow control device comprising a flow path between an annulus and the interior of the tubular;
the tubular coupled to the inflow control device; and
a swellable metal sealing element at least partially disposed in the flow path; wherein the swellable metal sealing element consists of a material selected from the group consisting of a metal, metal alloy, metal oxide, and any combination thereof.

18. The system of claim 17, wherein the metal is selected from the group consisting of magnesium, calcium, aluminum, and any combination thereof.

19. The system of claim 17, wherein the metal alloy comprises a metal selected from the group consisting of magnesium, calcium, aluminum, and any combination thereof.

20. The system of claim 17, wherein the inflow control device is disposed in a wellbore zone having a temperature of greater than 350° F.

* * * * *